United States Patent [19]

Theofanous

[11] Patent Number: 4,630,977
[45] Date of Patent: Dec. 23, 1986

[54] VALVE SEAT RESURFACING APPARATUS

[76] Inventor: Theos E. Theofanous, 4747 Kester Rd., Winston-Salem, N.C. 27103

[21] Appl. No.: 738,342

[22] Filed: May 28, 1985

[51] Int. Cl.⁴ ............................................. B23B 47/60
[52] U.S. Cl. .................................. 408/83.5; 408/127; 464/906; 51/241 VS
[58] Field of Search ............... 408/1 R, 127, 80, 83.5; 51/241 VS; 464/906

[56] References Cited

U.S. PATENT DOCUMENTS

| | | | |
|---|---|---|---|
| 1,985,278 | 12/1934 | Bradley | 464/906 |
| 3,617,143 | 11/1971 | McKee | 408/127 |
| 3,728,940 | 4/1973 | Peterson | 408/83.5 |
| 4,147,462 | 4/1979 | Appleby et al. | 408/80 |
| 4,555,205 | 11/1985 | Hiroyasu et al. | 51/241 VS X |

Primary Examiner—Z. R. Bilinsky
Attorney, Agent, or Firm—B. B. Olive

[57] ABSTRACT

An apparatus and method for resurfacing valve seats in a cylinder head are based upon utilizing a modified constant velocity universal joint of the type used in front wheel drive automobiles. A valve seat resurfacing cutting tool is driven at a constant velocity by the universal joint. Use of such joint allows the series of valve seats having parallel valve stem guide holes to be resurfaced after bringing the axis of one of the corresponding valve stem guide holes into a precise vertical position.

1 Claim, 5 Drawing Figures

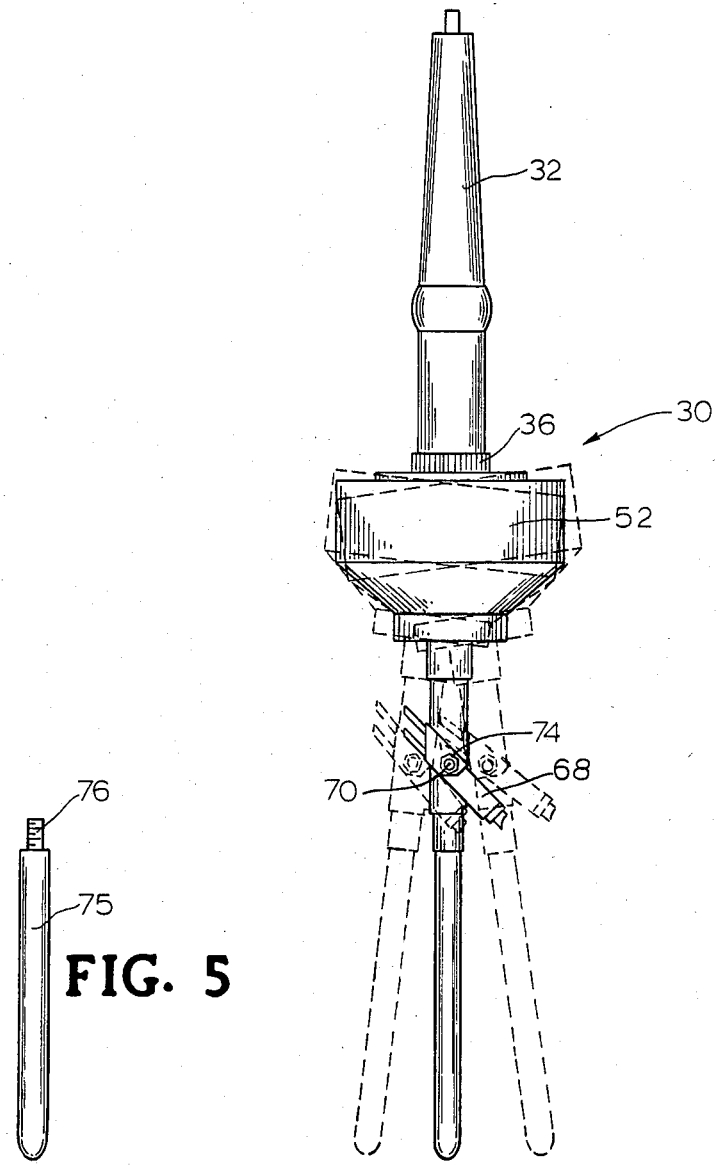

VALVE SEAT RESURFACING APPARATUS

TECHNICAL FIELD

The invention relates to apparatus used in engine head rebuilding and particularly to apparatus for resurfacing the valve seats of the cylinder head.

BACKGROUND ART

Engine rebuilding typically requires that the valve seats be resurfaced either by cutting or grinding new surfaces. For this purpose, the cylinder head is typically mounted in a cradle which can be maneuvered while supported on a air cushion. An example of such apparatus, trademarked "Winona", is made by Winona Van Norman Machine Company, 4730 West Highway 61, Winona, Minn. 55987.

The cutting tool used to resurface a valve seat is typically driven by a motor through a rigid connection between the cutting tool and the motor. The use of a rigid tool connection requires that each valve stem guide hole be leveled prior to resurfacing the corresponding valve seat. A rigid tool connection also requires that the axis of the drive chuck be held in precise alignment with the axis of the valve stem guide hole during resurfacing. By "leveling" is meant that the axis of the guide hole is brought into a true vertical position when the plane perpendicular to the axis of the guide hole is "level" or horizontal. Thus, it would be desirable to provide a method and apparatus enabling the valve seat to be resurfaced with a minimum need for leveling of the guide holes. So far as applicant is aware, a practical non-rigid-type connection has never been known to be used between the drive motor and the cutting tool to eliminate the need for having to level each guide hole for each valve seat cutting operation. More specifically, so far as applicant is aware, it has not been known to use a constant velocity universal joint drive connection in lieu of the conventional rigid drive.

DISCLOSURE OF THE INVENTION

The method and apparatus of the invention utilize a constant velocity universal joint connection between the drive motor and the cutting tool in a head rebuilding apparatus for resurfacing valve seats. The universal joint connection represents a modification of the type universal joint used for front wheel drives on automobiles. The modified joint is fitted on one end with a so-called "Morse taper" for insertion in the motor drive chuck and on the opposite end is fitted with a guide shaft and means to mount the cutting tool.

In use, the cylinder head of the engine being rebuilt is leveled on the air cushion support with the guide shaft inserted in a valve stem guide hole. For the type of cylinder head in which all the valve stem guide holes are parallel, all the valve seats can be resurfaced with the cutting tool by leveling one valve stem guide hole without requiring all other guide holes to be leveled. For the type cylinder head in which the valve stem guide holes comprise two separate sets in which the valve stem guide holes of each set are parallel, only one valve stem guide hole in each set is required to be leveled. Applicant has discovered the critical importance during resurfacing of achieving as near a constant velocity on the cutting tool as can practically be achieved. While the typical universal joint, such as commonly used between the transmission and differential of a rear wheel driven vehicle, is not a constant velocity type connection and is not required to be so, applicant has observed the availability of the typical front wheel drive universal joint as being as constant or near constant velocity type joint by reason of its construction. Thus, applicant has achieved a novel and practical valve seat resurfacing method and apparatus by utilizing a modified front wheel drive universal joint to achieve substantial constant velocity in the cutting tool and to allow all the valve seats to be resurfaced after leveling only one or at the most two of the valve stem guide holes associated with such valve seats.

DESCRIPTION OF THE DRAWINGS

FIG. 2 is a side elevation view of the universal joint connected valve seat resurfacing tool of the invention showing in solid lines the vertical and in dashed lines the typical off-vertical drive positions.

FIG. 5 is a side elevation view of the guide shaft used with the cutting tool of the invention.

BEST MODE FOR CARRYING OUT THE INVENTION

Figure 1:
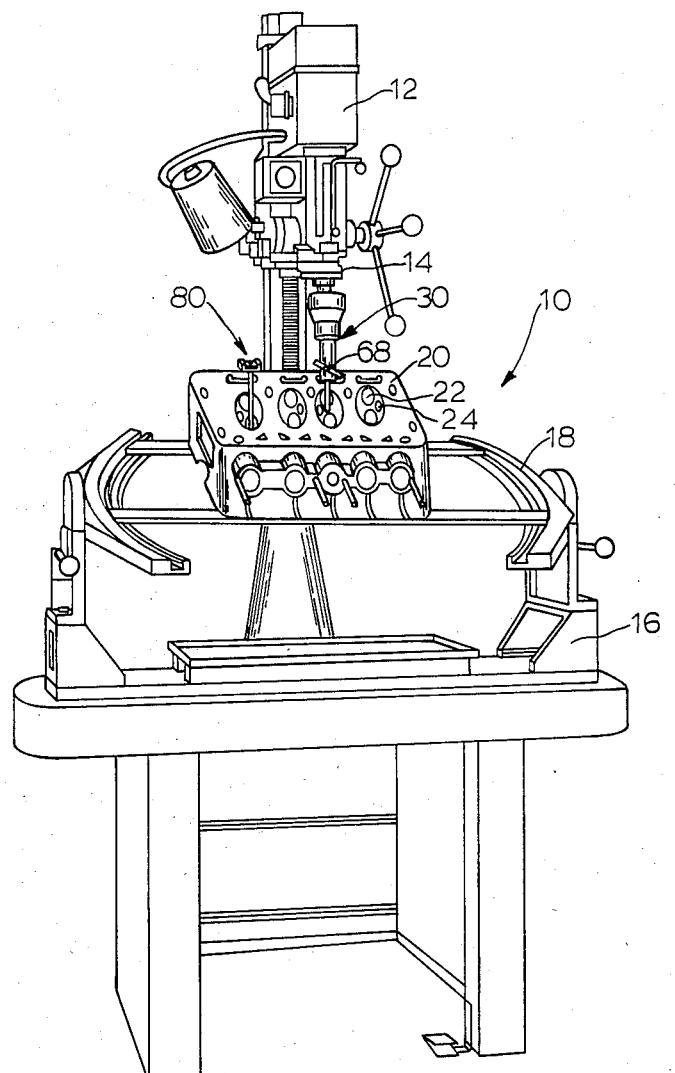
FIG. 1 is a perspective view of a conventional engine head rebuilding apparatus modified for resurfacing valve seats according to the invention.
Figure 4:
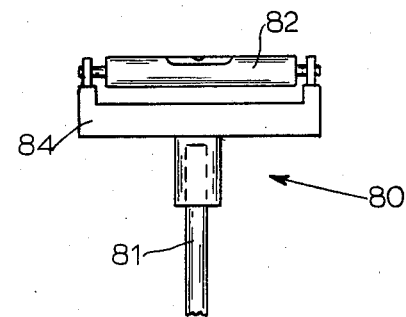
FIG. 4 is a side elevation view of the leveling device used with the invention.
Figure 3:
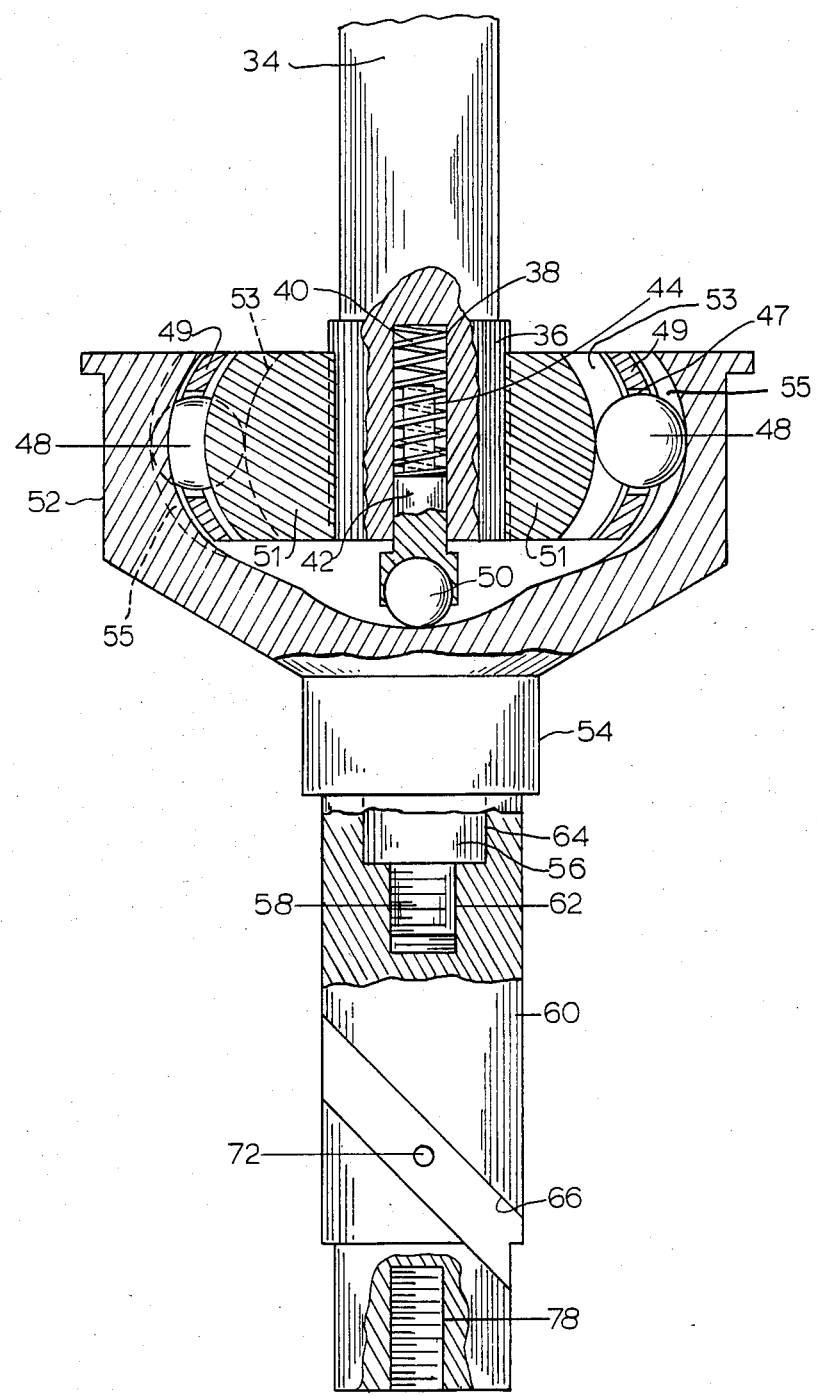
FIG. 3 is a partial cross-section view of the universal joint of the invention.

Referring initially to FIG. 1, there is illustrated a conventional air cushion supported engine head rebuilding apparatus 10 having a drive motor 12, a chuck 14 adapted for receiving a tool having a Morse taper, an air cushion supported bed 16 and an adjustable cradle 18 for supporting the engine cylinder head 20 by suitable securing means, not shown. Head 20 is assumed to have a plurality of intake valve seats 22 and exhaust valve seats 24 which are to be resurfaced in the course of rebuilding an engine in which head 20 is used. The present invention is directed primarily to this valve seat resurfacing operation. The previously-mentioned Winona-type engine head rebuilding apparatus represents the type apparatus to which the improved tool drive and method is best applied.

The tool assembly 30 of the invention comprises a constant velocity universal joint 32 representing a unique modification and adaptation of a conventional automobile front wheel drive connection. The "Lobro" constant velocity joint made and sold by Lohr and BromKemp GMBH Offenbach/Main, Germany, for use in front wheel drive automobiles and modified according to the invention has been found suitable for the purpose. Such conventional joint is modified in several respects for purpose of the invention. A Morse taper section 34 such as employed in conventional drill presses, milling machines, or the like, is welded to the shortened spline 36. Spline 36, in the conventional front wheel drive constant velocity joint, is substantially longer than shown and is conventionally connected to the automobile engine drive shaft. As a further modification, the spline section 36 is formed with a bore 38 for receiving a spring 40 and a ball mount 42 having a shank 44 around which the lower portion of spring 40 fits. A ball 50 rotatably mounts in ball mount 42. This arrangement has been found advantageous to eliminate lengthwise end play between outer ball housing 52 and spline section 36 secured in inner ball housing 51. Ball bearings 48, held in retainer passages 47 by ball retainer 49, operate in their normal manner and are received by inner ball bearing recesses 53 and outer ball bearing recesses 55.

As a further modification, the conventional spline driven shaft of the joint is modified to provide a stub shaft 54 with a reduced stub 56 and threaded shank 58. A mating tool mount shaft 60 is formed with an internal threaded hole 62 and recess 64 enabling tool mount shaft 60 to be threadably secured to the driven stub shaft 54. A slot 66 receives a cutting tool 68 which is secured by a threaded bolt 70 mounted in hole 72 and held by nut 74. A guide shaft 75 includes a threaded shank 76 of reduced diameter which is received by threaded hole 78 at the lower end of tool mount shaft 60 to secure guide shaft 75 to tool mount 60. In use, either the series of intake valve seats 22 or exhaust valve seats 24 are selected as the first series of valve seats to be resurfaced. Assuming that the series of exhaust valve seats 24 are to be first resurfaced, cylinder head 20 is maneuvered in its cradle 18 on the air cushion support base 16 of engine rebuilding apparatus 10 until guide shaft 75 can assume a substantially vertical position and a free sliding fit in the valve stem guide hole of the first exhaust valve seat 24 to be resurfaced. Precise leveling is accomplished by inserting guide shaft 81 of level device 80 in one of the valve stem guide holes in the series of valve seats being resurfaced. Spirit level 82 in cradle 84 which rotates on guide shaft 81 is then used to bring the valve stem guide hole in which the guide shaft 81 is mounted into true vertical by suitable adjustments of the cylinder head 20 on its mount. After the selected valve stem guide hole is leveled in this manner, the air cushion is released which restores base 16 to an effectively fixed position which in turn means that the guide hole in which shaft 75 is installed has been "leveled" in the sense of having its axis made perpendicular to a horizontal plane. The accurate leveling of this single guide hole for the first valve seat to be resurfaced in the series serves as a means for eliminating the need to "level" any other valve stem guide hole during the process of resurfacing the other valve seats in the series of exhaust valve seats. Cutting tool 68 is employed in a conventional manner to resurface the selected first exhaust valve seat 24 to be resurfaced during which tool 68 is driven through the constant velocity universal joint 32. To complete the sequence of resurfacing the remaining exhaust valve seats, the head 20 is simply shifted laterally by shifting the air cushion supported bed 16 an appropriate distance to allow the guide shaft 75 to enter the next valve stem guide hole corresponding to the next exhaust valve seat 24 to be resurfaced. No further leveling of such guide hole is required due to use of universal joint 32. Thus, there are eliminated the prior art practices of having to level each guide hole, one by one, as the resurfacing proceeds and of having to precisely align the chuck and valve stem guide hole axes.

After completing the resurfacing of the exhaust valve seats 24, the operation proceeds to resurfacing the intake valve seats 22. For this last operation, cradle 18 and bed 16 are maneuvered to allow guide shaft 75 to enter the first intake valve stem guide hole corresponding to the first intake valve seat 22 to be resurfaced. Guide shaft 75 is then allowed to follow the guide hole in which it has entered due to the ability of the constant velocity universal joint 32 to drive guide shaft 75 in off vertical positions as best illustrated in FIG. 2. One of the valve stem guide holes in the series of intake valves to be resurfaced is next selected and is leveled in the manner previously explained. All of the intake valve seats 22 are now resurfaced in sequence by shifting bed 16 laterally as required to allow the guide shaft 75 to move from one intake valve seat guide hole to another as the resurfacing operations proceed. In all such resurfacing operations, the cutting tool 68 is rotated at a substantially constant velocity which results in extremely smooth and accurate surface cutting. For the type of cylinder head in which all of the valve stem guide holes are parallel, it will also be appreciated that only a single valve stem guide hole leveling procedure is required. Of particular value to the valve seat resurfacing process is the fact that the constant velocity universal joint of the invention eliminates the need to bring the chuck axis in precise alignment with the valve stem guide hole axis to avoid binding.

While deemed primarily of value to resurfacing valve seats with a cutting tool, it is recognized that grinding tools could also be advantageously used with the constant velocity, universal joint driven tool holder of the invention.

What is claimed is:

1. An apparatus for sequentially and separately resurfacing cylinder head valve seats in an engine cylinder head having the seats formed therein and corresponding valve stem guide holes, comprising:
(a) a base mounting positionable support means for supporting said head with a selected valve seat and its corresponding valve stem guide hole in a selected position in which the axis of said guide hole is substantially vertical;
(b) drive means supported by said base above said positionable support means and having associated therewith an axially movable rotating chuck rotatable about a fixed vertical axis with means for releasably receiving a Morse tapered shaft of a tool to be driven;
(c) a constant velocity universal joint having:
 (i) a drive shaft having at one end a Morse taper releasably secured in, supported by and driven by said chuck and at the opposite end a spline section rotatable around said fixed axis and concentric with said taper and section;
 (ii) a driven shaft; and
 (iii) universal connecting means between said drive shaft and driven shaft comprising:
  (aa) an inner ball housing having a central bore portion mounted on, concentric with, supported and driven by said drive shaft spline section about said fixed axis and surrounding said central bore portion a first set of ball bearing receiving recesses;
  (bb) a ball bearing mounted in each of said recesses;
  (cc) a ball retainer surrounding and vertically movable relative to said inner ball housing and providing a ball retention passage for each said ball bearing;
  (dd) an outer ball housing having a first driven portion surrounding and vertically movable relative to said inner ball housing and ratainer and formed with a second set of ball bearing receiving recesses mounting and utilizing said ball bearings with said retainer to support said outer ball housing and form a driving connection with said inner ball housing in which said inner and outer ball housings are prevented from rotating relative to each other and having a second portion integrally formed with said drive shaft; and (ee) means for preventing end play between said outer and inner ball housings comprising a ball mount member having at one end a shank mounting a spring located in a bore formed in and concentric with said spline section and at the opposite end a rotatably mounted ball engaging an inner surface of said outer ball housing under the force of said spring to resist said end play while permitting both misalignment of said drive and driven shafts and vertical sliding of said shank in said bore, said universal connecting means being operative for maintaining the velocity of the driven shaft substantially constant when driven through said universal connecting means by said drive shaft independent of said drive shaft being axially aligned with said driven shaft during rotation thereof;

(d) a resurfacing tool mounting shaff secured to, forming an aligned extension of and driven by said driven shaft at said constant velocity;

(e) a resurfacing cutting tool removably secured to said tool-mounting shaft; and (f) a guide rod threadably secured to, forming an aligned extension of and extending outwardly from said tool-mounting shaft and adapted to enter and move axially in a selected said valve seat guide hole in a free sliding fit to bring said resurfacing tool in engagement with the corresponding valve seat for resurfacing thereof at said constant velocity.

* * * * *